Nov. 5, 1929.   G. F. WIKLE   1,734,242

TIRE BUILDING MACHINE

Filed July 5, 1927

INVENTOR.
George F. Wikle
BY
Robert M. Harvey
ATTORNEY.

Patented Nov. 5, 1929

1,734,242

UNITED STATES PATENT OFFICE

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

TIRE-BUILDING MACHINE

Application filed July 5, 1927. Serial No. 203,357.

My invention relates to a tire building machine of the type in which the carcass is built on a substantially flat drum or former. More particularly it relates to a device for accurately guiding strip material such as chafing strips, sidewall strips and so-called breaker strips into position on the tire carcass previously built up on the drum.

Among the objects of the invention is to provide a device of the above character which will guide a plurality of strips into position on the tire carcass with a minimum of attention from the operator and with a substantially uniform tension.

In the accompanying drawings which illustrate one embodiment of the invention:

Figures 1, 2:
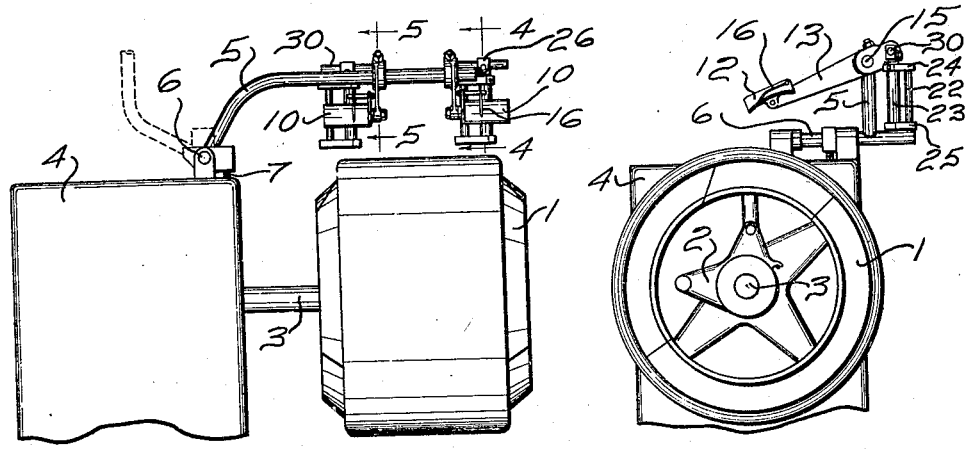
Fig. 1 is a front elevation showing the guiding devices in operative relation with the drum.
Fig. 2 is a side elevation of the structure shown in Fig. 1.

Referring to the drawings, 1 designates a collapsible building drum mounted on a chuck 2, secured on a shaft 3 of power unit 4. The guiding devices are carried on a supporting rod 5 pivoted at 6 to the housing of the power unit. Rod 5 is provided with an adjustable stop 7 by means of which the rods and the parts turned thereby may be accurately adjusted with respect to the building core. When not in use rod 5 may be swung into an inoperative position as shown by dotted line in Fig. 1. The guides comprise curved plates 10 provided with vertical side portions 12. These plates are secured to arms 13 by bolts 14 which permit angular adjustment of the plates with respect to the surface of the building drum. The extended arcuate surfaces of the plates assure a smooth application of the strips. The upright portion 12 carries horizontally extending rods 15 to which are secured spring fingers 16 adapted to engage the strips as they pass over plates 10. The rods 15 are secured to upright portions 12 by nuts 17 to permit adjustment of the pressure exerted by the fingers 16 on the strip passing over plate 10. Arms 13 are mounted for angular adjustment on 5 by means of locking pins 19 which are provided with recesses 20 adapted to be drawn into locking engagement with rods 5 by means of nuts 21.

For convenience of the operator it is desirable to have the supplies of strip material positioned at one side of the building machine. It is also desirable to have the strips come to guide plates 10 in a substantially straight line, that is aligned for application to the tire carcass. To secure these features guide rods 22 and rolls 23 are provided about which the strips pass from the supply to the guide plates. The guide rods 22 and 23 turn the strips into a vertical plane and are adjusted to bring that plane into alignment with the center line of application. The guide rods 22 and rolls 23 are carried by frame members 24 and 25, secured to blocks 26 by angle irons 27 by means of locking bolts 28 adapted to hold blocks 26 in adjusted position on rods 30 which project from arms 13.

Figures 3, 4:
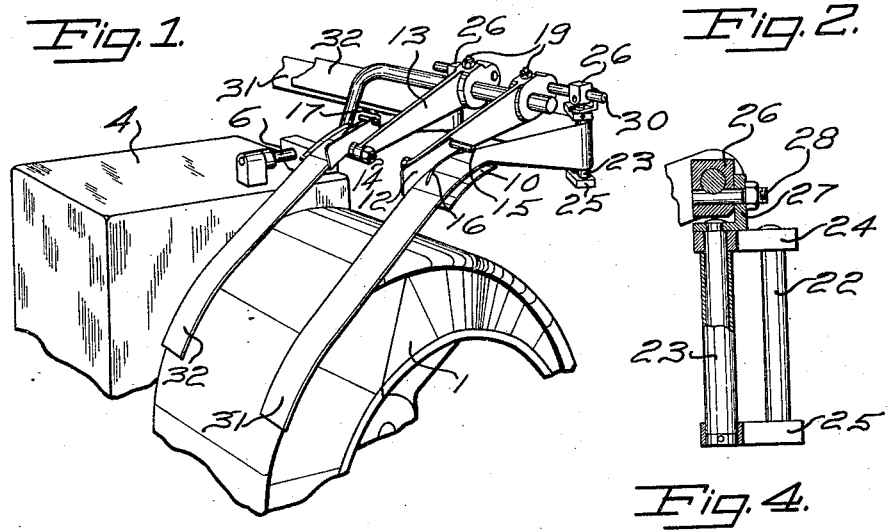
Fig. 3 is a perspective view showing the manner in which the strips are laid upon the tire carcass on the drum.
Fig. 4 is a detail view of one of the strip guides.
Figures 5, 6:
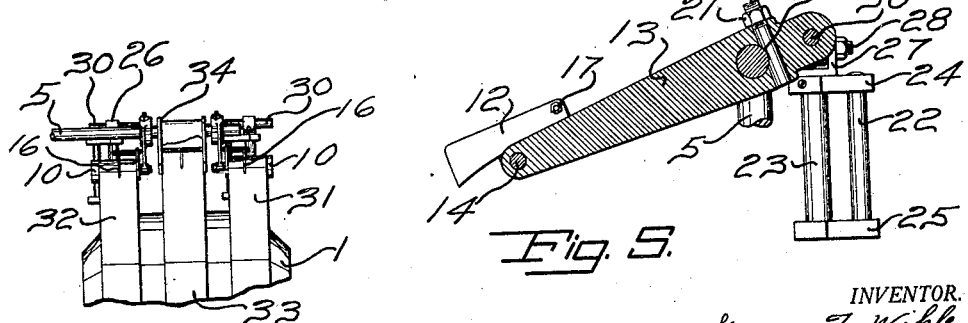
Fig. 5 is a sectional view substantially on line 5—5 of Fig. 1.
Fig. 6 is a view similar to that of Fig. 1 but showing a modified structure.

The operation is as follows: With the guiding devices in the position shown in Figs. 1, 2, and 3, strips of material indicated at 31 and 32 are drawn from a suitable source of supply, not shown, and brought around guide rods 22 and rolls 23 and across arcuate plates 10 beneath fingers 16 and into position on the core. It will be understood that arms 13, plate 10, fingers 16, guide rods 22, and rolls 23 have been so adjusted that the strips 31 and 32 pass to a predetermined position on the tire carcass accurately controlled by the adjusting of the members specified. It will be understood that if desired additional strips as indicated at 33 in Fig. 6 may be similarly applied by the addition of a central guide as indicated at 34 in the latter figure.

Having thus described my invention, I claim:

1. A device of the character described comprising guide plates adapted to be positioned adjacent the building drum of a tire building machine, means to adjust the plates across the width of the drum and means adjustable independently of the plates to guide strips of material to the latter.

2. A device of the character described comprising arcuate guide plates adapted to be positioned adjacent the drum of a tire building machine and over which strips of material pass to the drum, means associated with the plates to maintain the strips in desired position as they pass thereover, means to adjust the plates across the width of the drum and means adjustable independently of the plates to guide the strips to the latter.

3. A device of the character described comprising a support adapted to be positioned adjacent the drum of a tire building machine, arms adjustably mounted on the support and projecting over the drum, arcuate plates adjustably mounted on the free end of said arms and over which strips of material pass to the drum, means associated with the plates to maintain the strips in desired position as they pass thereover and means carried by said arms and adjustable with respect thereto to guide the strips to the plates.

4. A device of the character described comprising guide plates adapted to be positioned adjacent the drum of a tire building machine and over which strips of material pass to a tire carcass on the drum, and guides in the path of travel of the strips to the plates positioned to turn the strips temporarily into the vertical plane of the center line of application of the strips to the tire carcass on the drum.

GEORGE F. WIKLE.